United States Patent
Zhang et al.

(10) Patent No.: US 10,966,019 B2
(45) Date of Patent: Mar. 30, 2021

(54) AUDIO SIGNAL PROCESSING DEVICE AND SOUND BOX

(71) Applicant: SHENZHEN GRANDSUN ELECTRONIC CO., LTD., Guangdong (CN)

(72) Inventors: Shimin Zhang, Guangdong (CN); Haiquan Wu, Guangdong (CN); Dayong Tang, Guangdong (CN); Enqin Zhang, Guangdong (CN); Lei Cao, Guangdong (CN); Ruiwen Shi, Guangdong (CN)

(73) Assignee: SHENZHEN GRANDSUN ELECTRONIC CO., LTD., Guangdong (CN)

( * ) Notice: Subject to any disclaimer, the term of this patent is extended or adjusted under 35 U.S.C. 154(b) by 0 days.

(21) Appl. No.: 16/357,690

(22) Filed: Mar. 19, 2019

(65) Prior Publication Data
US 2019/0289391 A1 Sep. 19, 2019

(30) Foreign Application Priority Data
Mar. 19, 2018 (CN) .......................... 201810226561.1

(51) Int. Cl.
*H04R 3/00* (2006.01)
*G06F 13/42* (2006.01)
(Continued)

(52) U.S. Cl.
CPC .............. *H04R 3/00* (2013.01); *G06F 3/162* (2013.01); *G06F 13/4291* (2013.01); *H04R 3/12* (2013.01);
(Continued)

(58) Field of Classification Search
CPC ............ H04R 2420/00; H04R 2420/01; H04R 2420/03; H04R 2420/05; H04R 2420/07;
(Continued)

(56) References Cited

U.S. PATENT DOCUMENTS

| | | | | |
|---|---|---|---|---|
| 2004/0234088 | A1* | 11/2004 | McCarty | H04B 3/54 381/306 |
| 2006/0177046 | A1* | 8/2006 | Falcon | H04S 7/00 379/430 |

(Continued)

FOREIGN PATENT DOCUMENTS

| | | |
|---|---|---|
| CN | 1560848 A | 1/2005 |
| CN | 201383867 Y | 1/2010 |

(Continued)

OTHER PUBLICATIONS

STM32F405xx, datasheet, pp. 1-203, (Year: 2016).*

(Continued)

*Primary Examiner* — Leshui Zhang
(74) *Attorney, Agent, or Firm* — Leason Ellis LLP

(57) ABSTRACT

An audio signal processing device, including: a digital signal processing module, an input module, an output module, and a control module. The digital signal processing module is in connection with the input module and the output module, and the control module is in connection with the output module. The output module includes at least two output channels, with each output channel including a power amplifier and a speaker in series connection. The digital signal processing module is configured to receive an audio signal output by the input module and to process the audio signal with at least two different audio processing algorithms, and output the at least two audio processing signals. Each audio processing signal corresponds to one output channel. The control module is configured to control the (Continued)

operation state of the power amplifier of each output channel and the magnification thereof in operation.

18 Claims, 3 Drawing Sheets

(51) Int. Cl.
| | |
|---|---|
| *H04R 5/02* | (2006.01) |
| *G06F 3/16* | (2006.01) |
| *H04R 3/12* | (2006.01) |
| *H04S 3/00* | (2006.01) |

(52) U.S. Cl.
CPC ....... *H04R 5/02* (2013.01); *G06F 2213/0016* (2013.01); *H04R 2205/022* (2013.01); *H04R 2420/01* (2013.01); *H04R 2420/07* (2013.01); *H04R 2430/01* (2013.01); *H04S 3/008* (2013.01)

(58) Field of Classification Search
CPC ............ H04R 2420/09; H04R 2430/01; H04R 2430/20; H04R 2205/022; H04R 3/00; H04R 3/04; H04R 3/06; H04R 3/08; H04R 3/12; H04R 3/14; H04R 5/02; H04R 5/04; H04R 2205/024; H04R 2205/026; H04R 25/43; G06F 3/16; G06F 3/162; G06F 3/165; G06F 3/167; G06F 13/4282; G06F 13/4291; G06F 13/4295; G06F 2213/0016; H03G 1/02; H04B 1/202
USPC ..... 381/17–23, 300–307, 61, 77, 78, 80, 81, 381/82, 85, 86, 89, 332, 333, 336, 104, 381/105, 106, 107, 109, 110, 111, 116, 381/117, 119, 120, 123; 700/94
See application file for complete search history.

(56) References Cited

U.S. PATENT DOCUMENTS

| | | | | |
|---|---|---|---|---|
| 2007/0100485 | A1* | 5/2007 | Teramachi | ....... G11B 20/10527 700/94 |
| 2013/0329893 | A1* | 12/2013 | Lee | .......... H04R 5/02 381/28 |
| 2017/0238773 | A1 | 8/2017 | Chaffin | |
| 2017/0289673 | A1* | 10/2017 | Johnson | ................. H04R 1/288 |
| 2017/0289723 | A1 | 10/2017 | Yoo et al. | |
| 2018/0359567 | A1* | 12/2018 | Sondergaard | ............ H04R 5/02 |

FOREIGN PATENT DOCUMENTS

| | | | | |
|---|---|---|---|---|
| CN | 202721799 U | | 2/2013 | |
| CN | 104125527 A | * | 10/2014 | ............... H04R 3/00 |
| CN | 205029809 U | * | 2/2016 | ........... H04N 21/439 |
| CN | 107333206 A | * | 11/2017 | ............... H04R 5/02 |
| EP | 2672729 A1 | | 12/2013 | |

OTHER PUBLICATIONS

First Office Action dated Oct. 10, 2019 in corresponding Chinese Application No. 201810226561.1.
Extended Search Report dated May 29, 2019 in corresponding European Application No. 19163536.

* cited by examiner

AUDIO SIGNAL PROCESSING DEVICE AND SOUND BOX

CROSS-REFERENCE TO RELATED APPLICATIONS

This application claims priority to Chinese Patent Application No. 201810226561.1 filed on Mar. 19, 2019, the content of which is incorporated herein by reference.

TECHNICAL FIELD

The present application relates to the technical field of audio signal processing, and more particularly to an audio signal processing device and a sound box.

BACKGROUND

Audio files downloaded from the network by users are generally compressed audio files, and audio signals input by the users via microphones also include many noises. In case that the audio files downloaded from the network or the audio files picked up by the microphones are directly played, the finally displayed sound effect will be affected, reducing the user experience. Thus, audio signal processing is developed in order to achieve a better sound effect. An audio signal processing device is configured to process the previously input audio signal by using audio processing algorithms before playing the audio, so as to restore the information lost in the compression or to filter the noises. Commonly used audio processing algorithms include signal equalization, bass boost, delay and filtering, etc.

The existing audio signal processing devices in the market can only output audio signals with particular signal audio characteristics. However, different rooms often have different decoration layouts. In order to achieve the same sound effect in different rooms, it is required to configure different audio signal processing devices for different rooms, which obviously increases the cost. Moreover, the same user may have different needs for the finally played audio signals during different time periods. Therefore, the existing audio signal processing devices fail to meet the different needs of the same user in different time periods.

SUMMARY

In view of the above, it is an object of the present application to provide an audio signal processing device and a sound box configured so as to enable the same audio signal processing device to be adapted to rooms with different layouts and to meet the different needs of users in different time periods.

A first aspect of the present application provides an audio signal processing device, comprising: a digital signal processing module, an input module, an output module, and a control module. The digital signal processing module is in connection with the input module and the output module, and the control module is in connection with the output module. The output module comprises at least two output channels, with each output channel comprising a power amplifier and a speaker in series connection. The digital signal processing module is configured to receive an audio signal output by the input module and to process the audio signal with at least two different audio processing algorithms to obtain at least two audio processing signals, and output the at least two audio processing signals via the output module, wherein each audio processing signal corresponds to one output channel. The control module is configured to control whether the power amplifier of each output channel operates and the magnification thereof in operation during the process of outputting the audio processing signal by the output module.

A second aspect of the present application provides a sound box, comprising the above-described audio signal processing device. The sound box is in the form of a cylinder. Each speaker of the output module is installed at a side face and/or an end face of the sound box.

It can be known from the above, the audio signal processing device provided by the present application comprises: the digital signal processing module, the input module, the output module, and the control module. The digital signal processing module is in connection with the input module and the output module, and the control module is in connection with the output module. The output module comprises at least two output channels, with each output channel comprising the power amplifier and the speaker in series connection. The digital signal processing module is configured to receive the audio signal output by the input module and to process the audio signal with at least two different audio processing algorithms to output at least two audio processing signals to each output channel of the output module respectively. Each audio processing signal corresponds to one output channel. In addition, the control module is capable of controlling whether the power amplifier of each output channel operates and the magnification thereof in operation. It can be known from the above that the digital signal processing module adopts at least two audio processing algorithms to process the input audio signal, in order to obtain at least two audio processing signals, such that the audio signal processing device is capable of outputting audio signals with at least two audio characteristics. In addition, the audio signal processing device is also capable of mixing audio signals with different audio characteristics to achieve a desired sound effect. Therefore, the audio signal processing device provided by the present application can achieve various sound effects and be adapted to rooms of different layouts, and meet; different needs of users in different time periods, thereby improving the user experience as well as having certain entertainment effects.

DESCRIPTION OF THE DRAWINGS

In order to more clearly illustrate the technical solutions in the embodiments of the present application, the drawings used in the embodiments or the prior art description will be briefly described hereinbelow. Obviously, the drawings in the following description are only some embodiments of the present application. Other drawings may be obtained from those having ordinary skill in the art without departing from the scope of the invention.

DESCRIPTION OF EMBODIMENTS

In order to make the technical problems to be solved, technical solutions, and beneficial effects of the present application clearer, the present application will be further described in detail hereinbelow with reference to the accompanying drawings and embodiments. It should be understood that the specific embodiments described herein are merely intended to explain the application rather than to limit the present application.

First Embodiment

Figure 1:
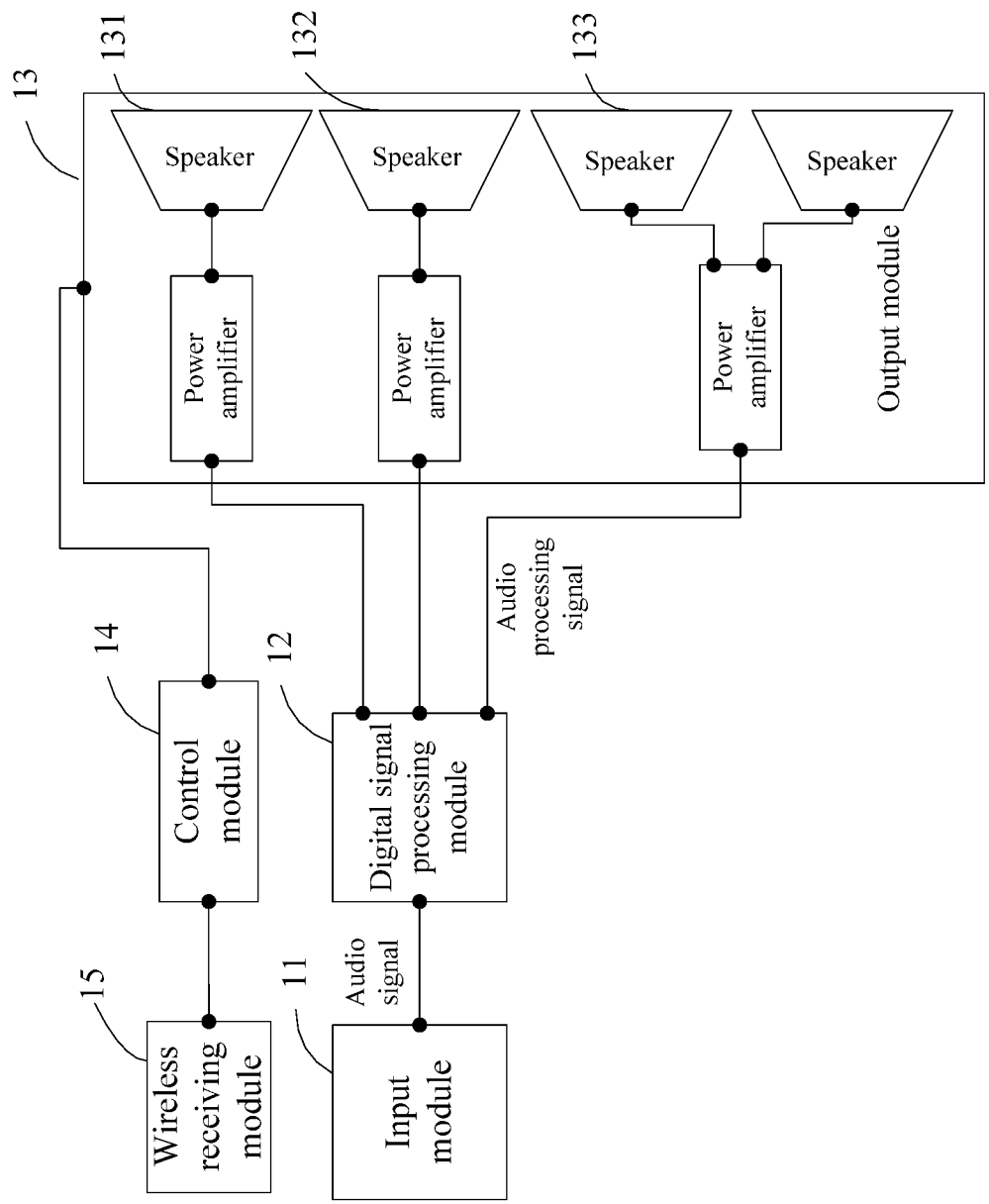
FIG. 1 is a structural schematic diagram of an audio signal processing device provided by a first embodiment of the present application.

An audio signal processing device provided by the first embodiment of the present application is described below. For the convenience of description, only the parts related to the present application are illustrated. As shown in FIG. 1, the audio signal processing device of the first embodiment of the present application comprises: an input module 11, a digital signal processor 12, an output module 13, and a control module 14.

The digital signal processor 12 is in connection with the input module 11 and the output module 13, and the control module 14 is in connection with the output module 13.

The output module 13 is composed of two or more output channels. In the first embodiment of the present application, the output module 13 is composed of three output channels, which are a first output channel 131, a second output channel 132, and a third output channel 133, respectively. Each of the output channels comprises a power amplifier and a speaker in series connection, and each of the output channels may comprise one or more speakers.

The digital signal processing module 12 is configured to receive an audio signal output by the input module 11 and to process the audio signal with at least two different audio processing algorithms to obtain at least two audio processing signals. In the first embodiment of the present application, the digital signal processing module 12 is configured to output three audio processing signals to the first output channel 131, the second output channel 132, and the third output channel 133, respectively. The three audio processing signals may be obtained by processing the audio signal by the digital signal processing module 12 using three audio processing algorithms, and the three audio processing algorithms may be high frequency filtering, intermediate frequency filtering, and low frequency filtering, respectively, by which, the high frequency part, the intermediate frequency part, and the low frequency part may be filtered from the audio signal to generate the three audio processing signals. Besides, in the embodiment of the present application, the digital signal processing module 12 may perform other processing such as delaying on the received audio signal in addition to filtering. Furthermore, the three audio processing signals can also be obtained by the digital signal processing module 12 using two audio processing algorithms, and in this case, two of the three audio processing signals are the same.

The control module 14 is configured to control whether or not the power amplifier of each of the output channels operates and to control the magnification of the power amplifier during operation. The control module 14 may control only one of the output channels to operate, and may also control several output channels to operate. The user may adopt buttons on the audio signal processing device to realize transmission of a control command, or adopt a control remoter to realize the transmission of the control command, and in such a case, the audio signal processing device may further comprise a wireless receiving module 15, 25, 35 in each of the first, second and third embodiments shown in FIGS. 1-3, respectively, which are configured to receive the control command sent from the user and transmit the control command to the control module 14. The control module 14 is configured to control the operation state of each of the output channels after receiving the control command transmitted from the user.

It can be known from the above that the digital signal processing module adopts at least two audio processing algorithms to process the input audio signal, in order to obtain at least two audio processing signals, such that the audio signal processing device is capable of outputting audio signals with at least two audio characteristics. In addition, the audio signal processing device is also capable of mixing audio signals with different audio characteristics to achieve a desired sound effect. Therefore, the audio signal processing device provided by the present application can achieve various sound effects, and be adapted to rooms of different layouts, and meet different needs of users in different time periods, thereby improving the user experience as well as having certain entertainment effects.

Second Embodiment

Figure 2:
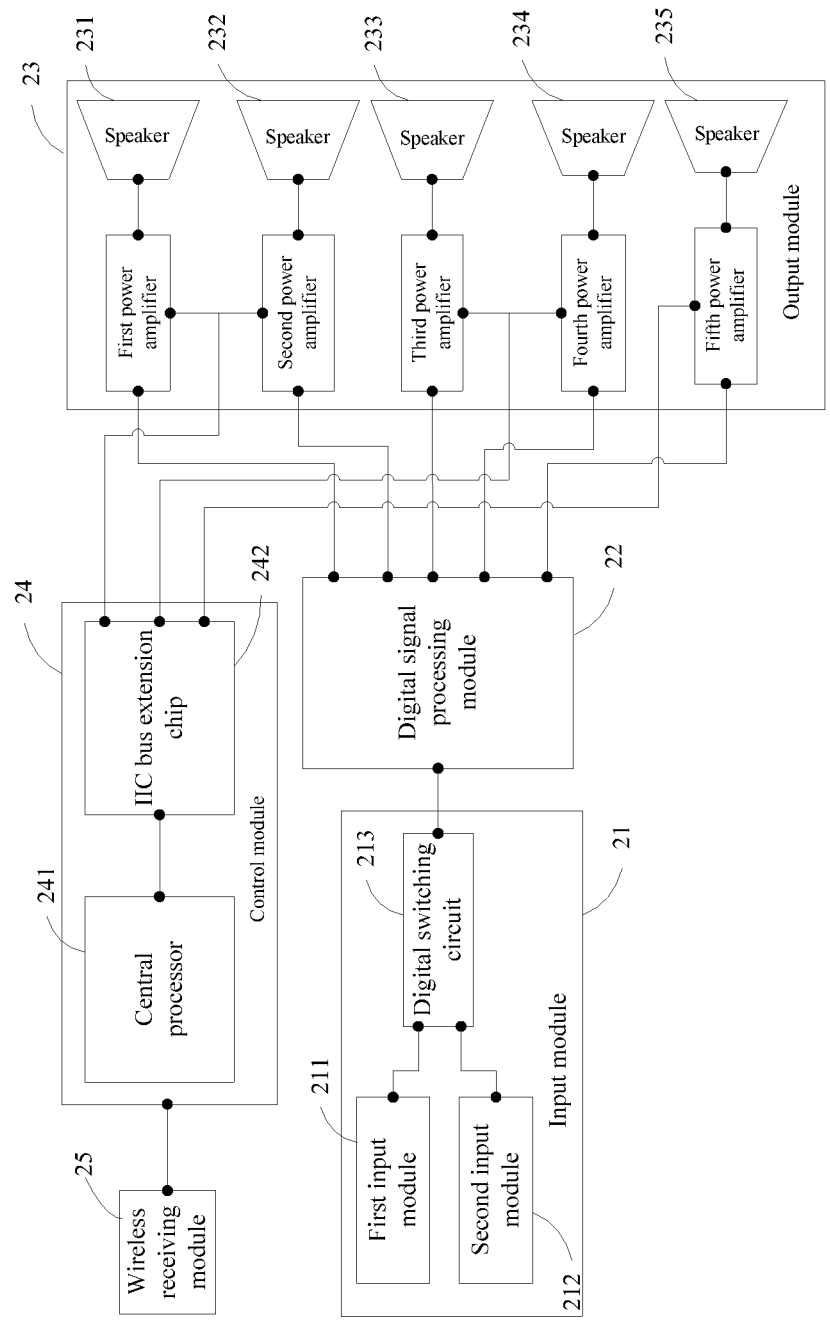
FIG. 2 is a structural schematic diagram of an audio signal processing device provided by a second embodiment of the present application.

FIG. 2 is a structural schematic diagram of an audio signal processing device provided by a second embodiment of FIG. 2. For the convenience of description, only the parts related to the present application are illustrated. The audio signal processing device comprises: an input module 21, a digital signal processor 22, an output module 23, and a control module 24.

The input module 21 comprises a first input module 211, a second input module 212, and a digital switching circuit 213. The first input module 211 is configured to receive a network audio signal or a digital audio signal and convert the network audio signal or the digital audio signal into an inter-IC sound (I2S) signal. The second input module 212 is configured to receive an analog audio signal and convert the analog audio signal into an I2S signal. The digital switching circuit 213 is in connection with the first input module 211 and the second input module 212 and is configured to choose either the I2S signal output from the first input module 211 or the I2S signal output from the second input module 212 to be transmitted to the digital signal processor 22. The digital switching circuit 213 may comprises a control unit or a two-channel switch, where the control unit may have a general-purpose input output (GPIO) port, where the GPIO port is in connection with the two-channel switch, and the control unit achieves the signal selection by controlling the level of the GPIO port.

In the second embodiment of the present application, the digital signal processor 22 has the same function as the digital signal processor 12 in the first embodiment, the details of which may be referred to in the description of the first embodiment and thus are not repeated here.

The output module 23 comprises five output channels, which are a first output channel 231, a second output channel 232, a third output channel 233, a fourth output channel 234, and a fifth output channel 235, respectively. The first output channel 231 comprises a first power amplifier, the second output channel 232 comprises a second power amplifier, the third output channel 233 comprise a third power amplifier, the fourth output channel 234 comprises a fourth power amplifier, and a fifth output channel 235 comprises a fifth power amplifier.

The control module 24 is composed of a central processor 241 and an IIC bus extension chip 242. The central processor 241 has an IIC bus output port, and the central processor 241 is in connection with the IIC bus extension chip via the IIC bus output port. The IIC bus extension chip comprises: a first IIC bus output port, a second IIC bus output port, and a third IIC bus output port. The central processor 241 is configured to receive the control command sent from the user, and transmit the control command via the IIC bus extension chip to the output module 23, so as to control the operation state of each of the output channels of the output module 23.

The first IIC bus output port is in connection with the first power amplifier and the second power amplifier. The first power amplifier and the second power amplifier have different addresses, and the central processor 241 is configured to control whether the first power amplifier operates and to control the magnification of the first amplifier during operation, and to control whether the second power amplifier operates and to control the magnification of the second power amplifier during operation, through the first IIC bus output port. The second IIC bus output port is in connection with the third power amplifier and the fourth power amplifier. The third power amplifier and the fourth power amplifier have different addresses, and the central processor 241 is configured to control whether the third power amplifier operates and to control the magnification of the third power amplifier during operation, and to control whether the fourth power amplifier operates and to control the magnification of the fourth power amplifier during operation, through the second IIC bus output port. The third IIC bus output port is in connection with the fifth power amplifier and the central processor 241 is configured to control whether the fifth power amplifier operates and to control the magnification during operation, through the third IIC bus output port.

Since the central processor generally has a GPIO port, the control unit may be integrated into the central processor 241. The central processor 241 is in connection with the two-channel switch of the digital switching circuit 213 via the GPIO port for controlling the digital switching circuit 213 to achieve the signal selection. Therefore, in order to save production cost, the first input module 211 may also be integrated into the central processor 241. In the second embodiment, an APQ8009 chip may be selected as the central processor.

In addition, in the second embodiment, the IIC bus extension chip 242 may further comprise a fourth IIC bus output port, which is configured to achieve data communication between the central processor 241 and the digital signal processor 22, for example, controlling whether the digital signal processor 22 operates.

It can be known from the above that in comparison with the first embodiment, the second embodiment adopts the digital switching circuit to achieve the selection of multiple input signals and also provides the specific implementations of the control module. Furthermore, the audio signal processing device provided by the second embodiment of the present application can achieve various sound effects, be adapted to rooms of different layouts, and meet different needs of users in different time periods, thereby improving the user experience as well as having certain entertainment effects.

Third Embodiment

Figure 3:
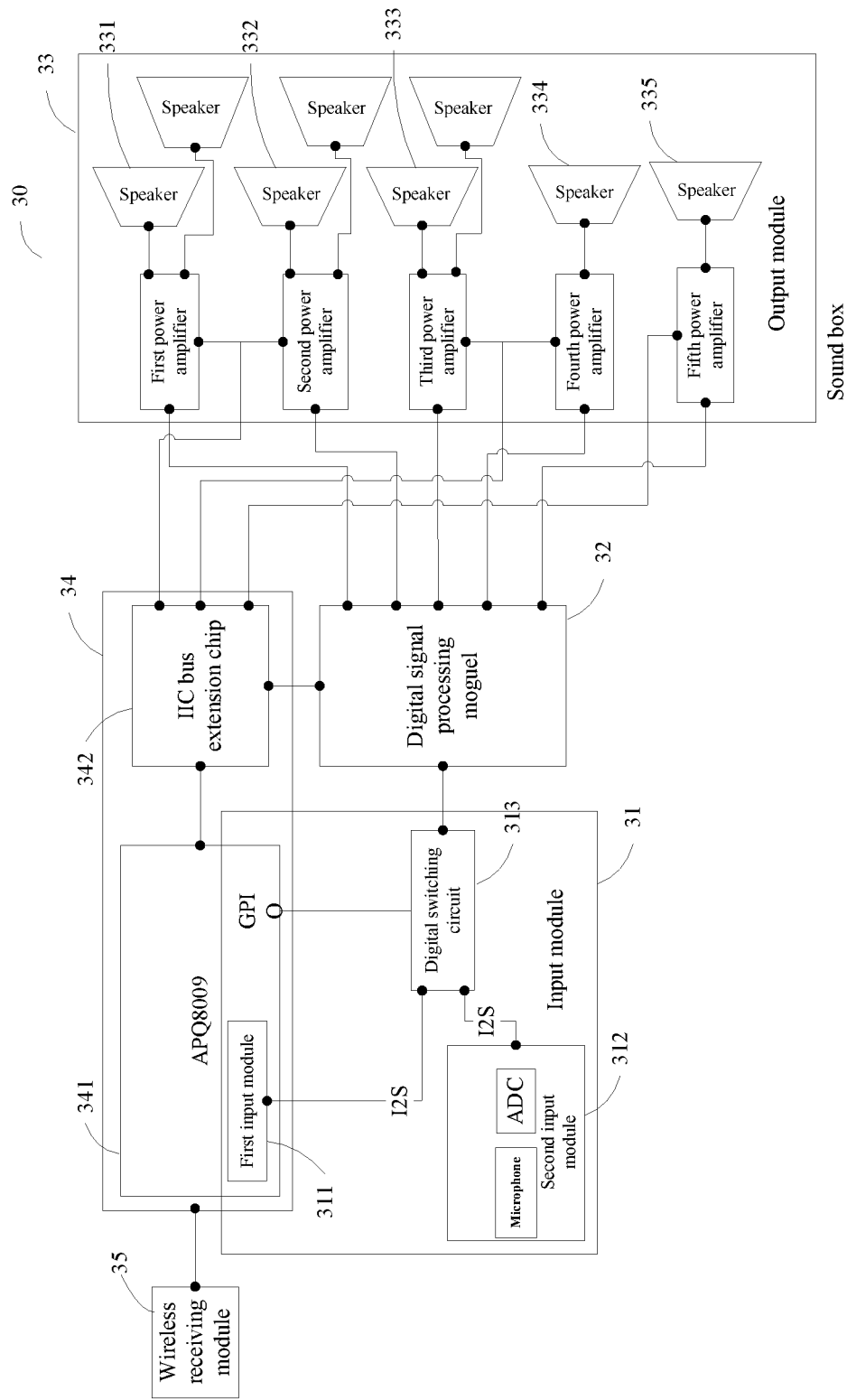
FIG. 3 is a structural schematic diagram of a sound box provided by a third embodiment of the present application.

FIG. 3 is a structural schematic diagram of a sound box provided by a third embodiment of the present application. For the convenience of description, only the parts related to the present application are illustrated. The sound box comprises an audio signal processing device, and the audio signal processing device comprises: an input module 31, a digital signal processor 32, an output module 33, and a control module 34.

The input module 31 comprises a first input module 311, a second input module 312, and a digital switching circuit 313. The first input module 311 is integrated into the APQ8009 central processor 341 of the control module 34. The APQ8009 central processor 341 of the control module 34 further has a GPIO port, which is configured to control the operation state of the digital switching circuit 313. In addition, the second input module 312 comprises a microphone and an analog-to-digital converter (ADC) configured to convert an analog audio signal input from the user into an I2S signal. In this embodiment of the present application, the input module 31 has the same function as that of the input module 21 of the second embodiment, details of which can be referred to in the description of the second embodiment, and will not be repeated here.

In the third embodiment of the present application, the digital signal processor 32 adopts two different audio processing algorithms to process the audio signal output from the input module. The two different audio signal processing algorithms may be high-intermediate frequency filtering and low frequency filtering. In the third embodiment of the present application, the digital signal processor 32 is configured to output five audio processing signals, of which, one audio processing signal is an audio processing signal after low frequency filtering, and the other four audio processing signals are audio processing signals after high-intermediate frequency filtering.

In the third embodiment of the present application, the output module 33 has five output channels configured to output five audio processing signals output from the digital signal processor 32. The five output channels are a first output channel 331, a second output channel 332, a third output channel 333, a fourth output channel 334, and a fifth output channel 335, respectively. The first output channel 331 comprises a first power amplifier and two speakers. The second output channel 332 comprises a second power amplifier and two speakers. The third output channel 333 comprises a third power amplifier and two speakers. The fourth output channel 334 comprises a fourth power amplifier and a speaker. The fifth output channel 335 comprises a fifth power amplifier and a speaker. The first output channel to the fourth output channel are configured to output the audio processing signals after the high-intermediate frequency filtering, and the fifth output channel is configured to output the audio processing signal after low frequency filtering.

The control module 34 comprises an APQ8009 central processor 341 and an IIC bus extension chip 342. The APQ8009 341 has an IIC bus output port, through which the APQ8009 341 is in connection with the IIC bus extension chip 342. The IIC bus extension chip 342 comprises: a first IIC bus output port, a second IIC bus output port, a third IIC bus output port, and a fourth IIC bus output port. The APQ8009 341 is capable of receiving a control command sent from a user, and transmitting the control command through the IIC bus extension chip 342 to the output module 33 and the digital signal processor 32 so as to control the operation state of each of the output channels of the output module 33 and the operation state of the digital signal processor 32. In the third embodiment of the present application, the communication modes between the IIC bus extension chip 342 and the output module 33 as well as the digital signal processor 32 can be referred to in the description of the second embodiment, which will not be repeated here.

In addition, the sound box provided by the third embodiment of the present application may be in the form of a cylinder, a cube, a cuboid, or an ellipsoid, etc., the seven speakers of the first output channel to the fourth output channel of the sound box are installed at a side face of the sound box, and the seven speakers may be installed at the side face of the sound box in an circular arrangement or in a spiral arrangement. The speaker of the fifth output channel may be installed at an end face of the sound box.

It can be known from the above that in the third embodiment of the present application, the audio signal processing device are packed into the sound box, which is convenient for use by the user. Besides, the sound box can achieve various sound effects, be adapted to rooms of different layouts, and meet different needs of users in different time periods, thereby improving the user experience as well as having certain entertainment effects.

The above embodiments are only used to illustrate the technical solutions of the present application, and are not intended to limit the present application. Although the present application has been described in detail with reference to the foregoing embodiments, those skilled in the art would understand that modifications may be made to the technical solutions or some of the technical features may be substituted by equivalents. These modifications or substitutions not deviating from the spirit and scope of the technical solutions of the embodiments of the present application should be included within the protection scope of the present application.

What is claimed is:

1. An audio signal processing device, comprising:
a digital signal processor, an input module, an output module, a wireless receiving module, and a control module;
wherein
the digital signal processor is in connection with the input module and the output module, and the control module is in connection with the output module and the wireless receiving module;
the output module comprises at least two output channels, each of the at least two output channels comprises a power amplifier and a speaker in series connection;
the digital signal processor is configured to receive an audio signal output by the input module and to separately process the audio signal with at least two different audio processing algorithms to obtain at least two audio processing signals, and output the at least two audio processing signals via the output module, wherein each of the at least two audio processing signals corresponds to each of the at least two output channels, respectively;
the control module is configured to control whether the power amplifier of each of the at least two output channels operates and to control the magnification of the power amplifier in an operation during a process of outputting the audio processing signal by the output module; and
the wireless receiving module is configured to receive a control command sent from a user, and to transmit the control command to the control module; the control module is configured to control whether the power amplifier of each of the at least two output channels operates and to control the magnification of the power amplifier in the operation according to the control command.

2. The audio signal processing device of claim 1, wherein the control module comprises a central processor and an IIC bus extension chip; and
the central processor is in connection with the output module via the IIC bus extension chip and is configured to control whether the power amplifier of each of the at least two output channels operates and to control the-magnification of the power amplifier in the operation.

3. The audio signal processing device of claim 2, wherein the output module comprises: a first output channel and a second output channel, of which, the first output channel comprises a first power amplifier, and the second output channel comprises a second power amplifier;
the IIC bus extension chip comprises a first IIC bus output port;
the first IIC bus output port is in connection with the first power amplifier and the second power amplifier, and the central processor is configured to control whether the first power amplifier operates and to control the magnification of the first amplifier in the operation, and to control whether the second power amplifier operates and to control the magnification of the second power amplifier in the operation, through the first IIC bus output port.

4. The audio signal processing device of claim 3, wherein the output module further comprises: a third output channel and a fourth output channel, of which, the third output channel comprises a third power amplifier, and the fourth output channel comprises a fourth power amplifier;
the IIC bus extension chip comprises a second IIC bus output port;
the second IIC bus output port is in connection with the third power amplifier and the fourth power amplifier, and the central processor is configured to control whether the third power amplifier operates and to control the magnification of the third power amplifier in the operation, and to control whether the fourth power amplifier operates and to control the magnification of the fourth power amplifier in the operation, through the second IIC bus output port.

5. The audio signal processing device of claim 4, wherein the output module further comprises a fifth output channel, and the fifth output channel comprises a fifth power amplifier;
the IIC bus extension chip comprises a third IIC bus output port; and
the third IIC bus output port is in connection with the fifth power amplifier, and the central processor is configured to control whether the fifth power amplifier operates and to control the magnification of the fifth power amplifier in the operation, through the third IIC bus output port.

6. The audio signal processing device of claim 5, wherein the IIC bus extension chip further comprises a fourth IIC bus output port; the fourth IIC bus output port is in connection with the digital signal processor and is configured to control whether the-digital signal processor operates.

7. The audio signal processing device of claim 2, wherein the input module comprises a first input module, a second input module, and a digital switching circuit;
the first input module is configured to convert a network audio signal or a digital audio signal into an inter-IC sound signal, the second input module is configured to convert an analog audio signal into the inter-IC sound signal;
an input port of the digital switching circuit is in connection with the first input module and the second input module, and an output port of the digital switching circuit is in connection with the-digital signal processor and configured to choose either the inter-IC sound signal output from the first input module or the inter-IC sound signal output from the second input module as the audio signal to be received by the digital signal processor.

8. The audio signal processing device of claim 7, wherein the central-processor has a general-purpose input output port, via which the central processor is in connection with the digital switching circuit;
the digital switching circuit is configured to choose the inter-IC sound signal output from the first input module or from the second input module as the audio signal to be received by the-digital signal processor according to the level of the general-purpose input output port.

9. The audio signal processing device of claim 7, wherein the first input module is integrated into the central processor.

10. The audio signal processing device of claim 2, wherein the central processor is an APQ8009 chip.

11. A sound box, comprising the audio signal processing device of claim 1, wherein the sound box is in the form of a cylinder; each speaker of the output module is installed at a side face and/or an end face of the sound box.

12. The sound box of claim 11, wherein
the output module comprises a first output channel, a second output channel, a third output channel, a fourth output channel, and a fifth output channel; wherein, each of the first output channel, the second output channel, and the third output channel comprises two speakers, and each of the fourth output channel and the fifth output channel comprises one speaker; and
wherein, seven of the speakers of the first output channel to the fifth output channel are installed at the side face of the sound box, and the other one of the speakers is installed at the end face of the sound box.

13. The sound box of claim 12, wherein
the digital signal processor adopts two different audio processing algorithms, the two different audio processing algorithms are high-intermediate frequency filtering and low frequency filtering;
the seven speakers of the first output channel to the fourth output channel are configured to output audio processing signals after the high-intermediate frequency filtering, and the fifth output channel is configured to output the audio processing signal after the low frequency filtering; and
the seven speakers of the first output channel to the fourth output channel are installed at the side face of the sound box, and the speaker of the fifth output channel is installed at the end face of the sound box.

14. The sound box of claim 11, wherein the control module comprises a central processor and an IIC bus extension chip; and
the central-processor is in connection with the output module via the IIC bus extension chip and is configured to control whether the power amplifier of each of the at least two output channels operates and to control the-magnification of the power amplifier in the operation.

15. The sound box of claim 14, wherein the IIC bus extension chip comprises a first IIC bus output port, a second IIC bus output port, and a third IIC bus output port;

the first IIC bus output port is in connection with a first power amplifier of the first output channel and a second power amplifier of the second output channel, and the central processor is configured to control whether the first power amplifier operates and to control the magnification of the first amplifier in the operation, and to control whether the second power amplifier operates and to control the magnification of the second power amplifier in the operation, through the first IIC bus output port;
the second IIC bus output port is in connection with a third power amplifier of the third output channel and a fourth power amplifier of the fourth output channel, and the central processor is configured to control whether the third power amplifier operates and to control the magnification of the third power amplifier in the operation, and to control whether the fourth power amplifier operates and to control the magnification of the fourth power amplifier in the operation, through the second IIC bus output port;
the third IIC bus output port is in connection with a fifth power amplifier of the fifth output channel, and the central processor is configured to control whether the fifth power amplifier operates and to control the magnification of the fifth power amplifier in the operation, through the third IIC bus output port.

16. The sound box of claim 15, wherein the IIC bus extension chip further comprises a fourth IIC bus output port; the fourth IIC bus output port is in connection with the digital signal processor and is configured to control whether the digital signal processor operates.

17. The sound box of claim 14, wherein
the input module comprises a first input module, a second input module, and a digital switching circuit;
the first input module is configured to convert a network audio signal or a digital audio signal into an inter-IC sound signal, the second input module is configured to convert an analog audio signal into the inter-IC sound signal;
an input port of the digital switching circuit is in connection with the first input module and the second input module, and an output port of the digital switching circuit is in connection with the-digital signal processor and configured to choose either the inter-IC sound signal output from the first input module or the inter-IC sound signal output from the second input module as the audio signal to be received by the digital signal processor.

18. The sound box of claim 17, wherein the central processor has a general-purpose input output port, via which the central processor is in connection with the digital switching circuit;
the digital switching circuit is configured to choose the inter-IC sound signal output from the first input module or from the second input module as the audio signal to be received by the-digital signal processor according to the level of the general-purpose input output port.

* * * * *